(12) United States Patent
Benck et al.

(10) Patent No.: US 10,518,320 B2
(45) Date of Patent: Dec. 31, 2019

(54) CASTING APPARATUS FOR PRODUCING CASTINGS FROM A METALLIC MELT

(71) Applicant: Nemak, S.A.B. de C.V., Garcia (MX)

(72) Inventors: Ryan Benck, Sheboygan, WI (US);
Jared Ottmann, Sheboygan, WI (US);
Scott Martin, Sheboygan, WI (US)

(73) Assignee: Nemak, S.A.B. de C.V., Garcia, Nuevo Leon (MX)

( * ) Notice: Subject to any disclaimer, the term of this patent is extended or adjusted under 35 U.S.C. 154(b) by 186 days.

(21) Appl. No.: 15/896,476

(22) Filed: Feb. 14, 2018

(65) Prior Publication Data

US 2019/0151939 A1    May 23, 2019

(30) Foreign Application Priority Data

Nov. 17, 2017   (EP) .................................... 17202310

(51) Int. Cl.
*B22D 17/26*   (2006.01)
*B29C 45/64*   (2006.01)
*B22D 17/32*   (2006.01)
*B29C 45/67*   (2006.01)

(52) U.S. Cl.
CPC ........... *B22D 17/266* (2013.01); *B22D 17/32* (2013.01); *B29C 45/6728* (2013.01)

(58) Field of Classification Search
CPC .... B22D 17/26; B22D 17/263; B22D 17/266; B29C 45/64; B29C 45/66; B29C 45/67; B29C 45/6728
See application file for complete search history.

(56) References Cited

U.S. PATENT DOCUMENTS

| 4,304,540 | A | | 12/1981 | Hammon |
| 4,874,309 | A | * | 10/1989 | Kushibe ............... B29C 45/6728 |
| | | | | 425/589 |
| 9,452,559 | B2 | * | 9/2016 | Zeidlhofer ............... B29C 45/84 |
| 2003/0217829 | A1 | | 11/2003 | Baron et al. |
| 2004/0178536 | A1 | | 9/2004 | Kato et al. |

(Continued)

FOREIGN PATENT DOCUMENTS

| EP | 0296410 A1 | 12/1988 |
| EP | 2199025 A1 | 6/2010 |

OTHER PUBLICATIONS

Wikipedia, "Die Casting", https:/en.wikipedia.org/wiki/Die_casting (Accessed Dec. 4, 2018).

*Primary Examiner* — Kevin E Yoon
(74) *Attorney, Agent, or Firm* — The Webb Law Firm

(57) ABSTRACT

A casting apparatus including a casting die having at least two die halves movable relative to one another between a closed position and an open position, the die halves each comprising a front surface in which a recess is formed, an adjusting device for moving one of the die halves, and a clamping device switchable between a clamping position when the die is closed, and a release position when the die is open. The clamping device is an integral part of the die halves and includes a counter bearing and a locking device. In the clamping position, the locking device is in a form fitting engagement with the counter bearing to lock the die halves in the closed position, and in the release position, the locking device is released from the counter bearing to release the die halves from each other for opening of the die.

15 Claims, 7 Drawing Sheets

(56) References Cited

U.S. PATENT DOCUMENTS

2015/0044325 A1* 2/2015 Kato .................... B22D 17/263
    425/589
2016/0354952 A1* 12/2016 Dirneder ............. B29C 45/6728

* cited by examiner

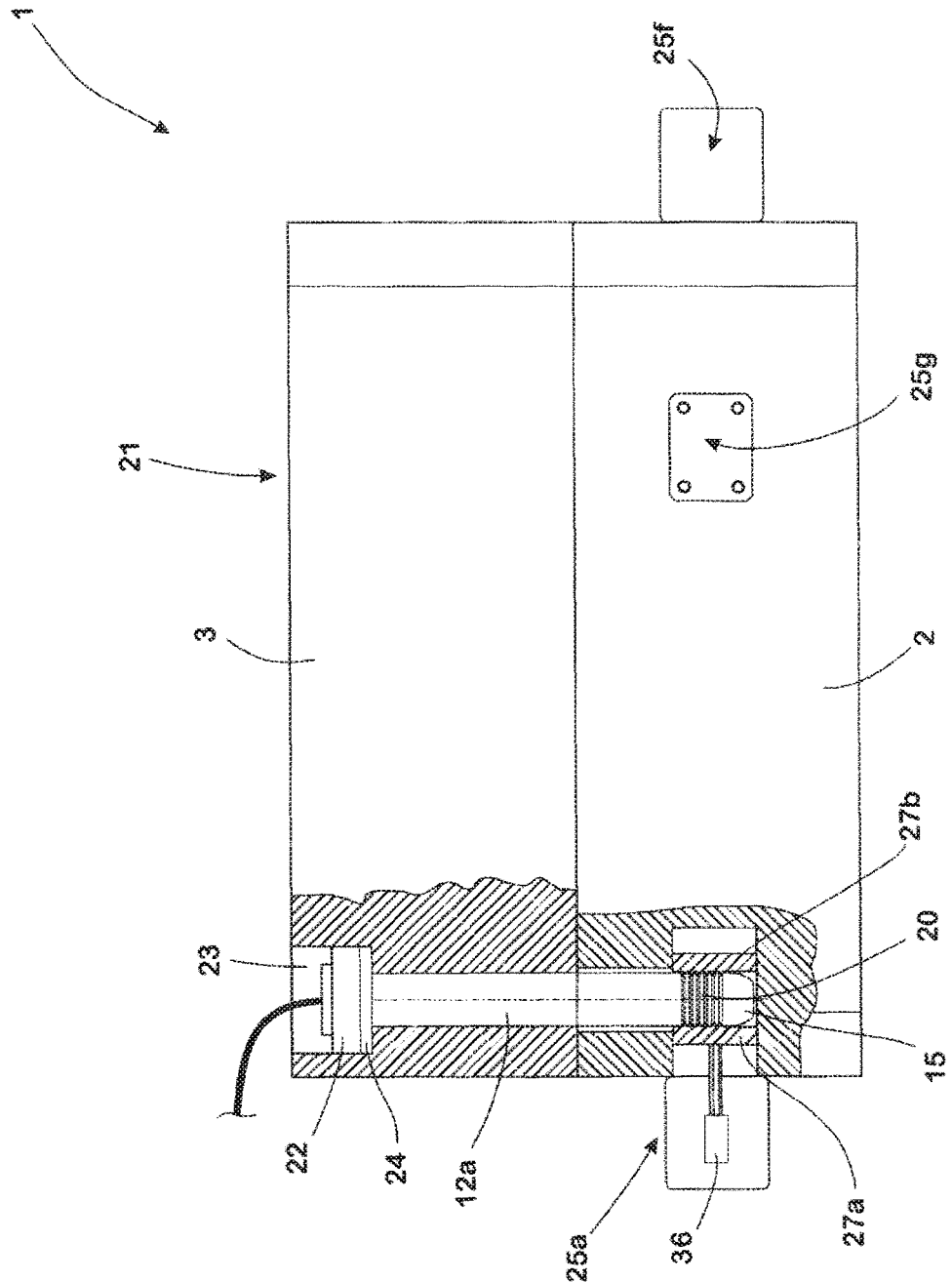

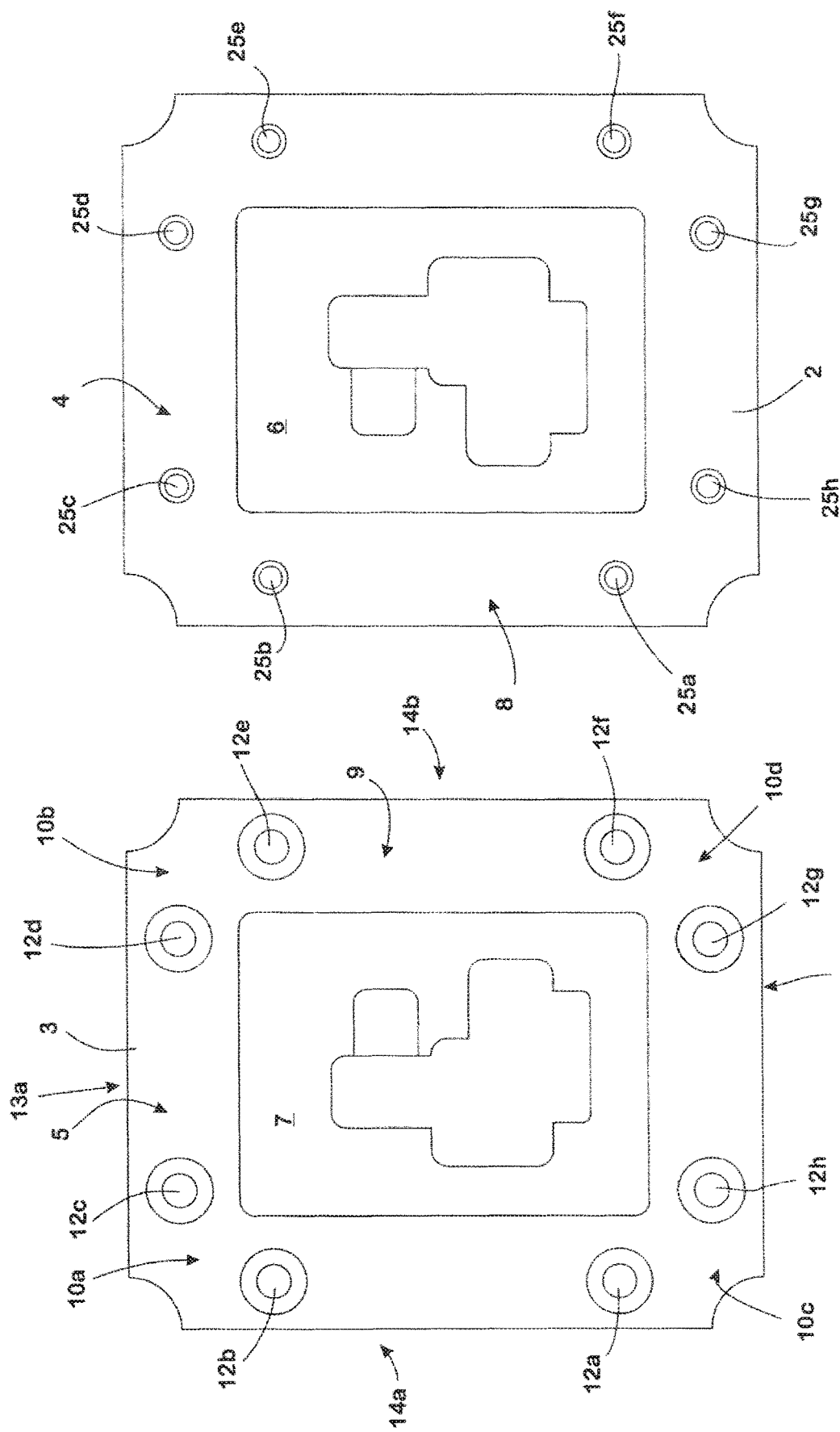

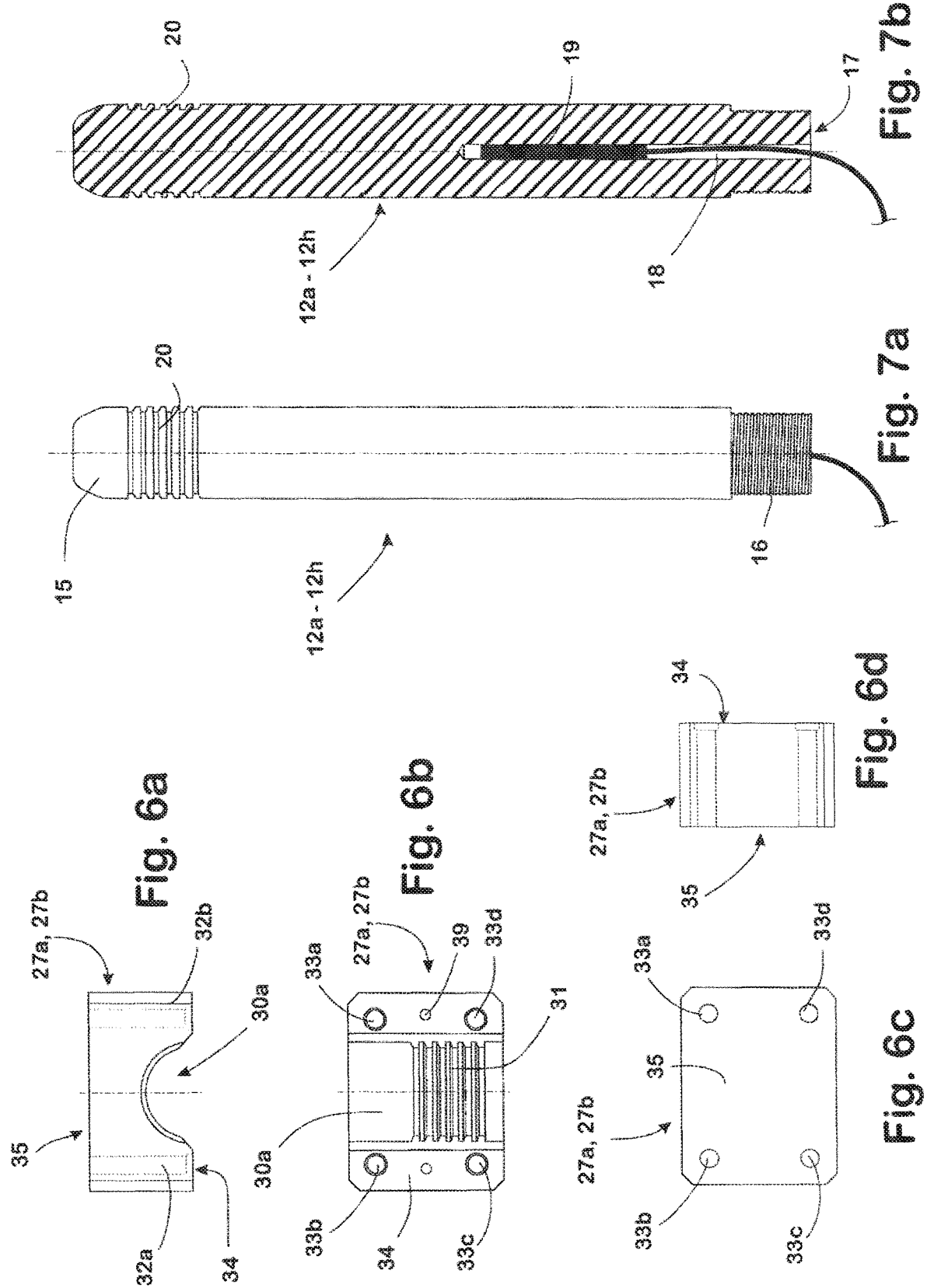

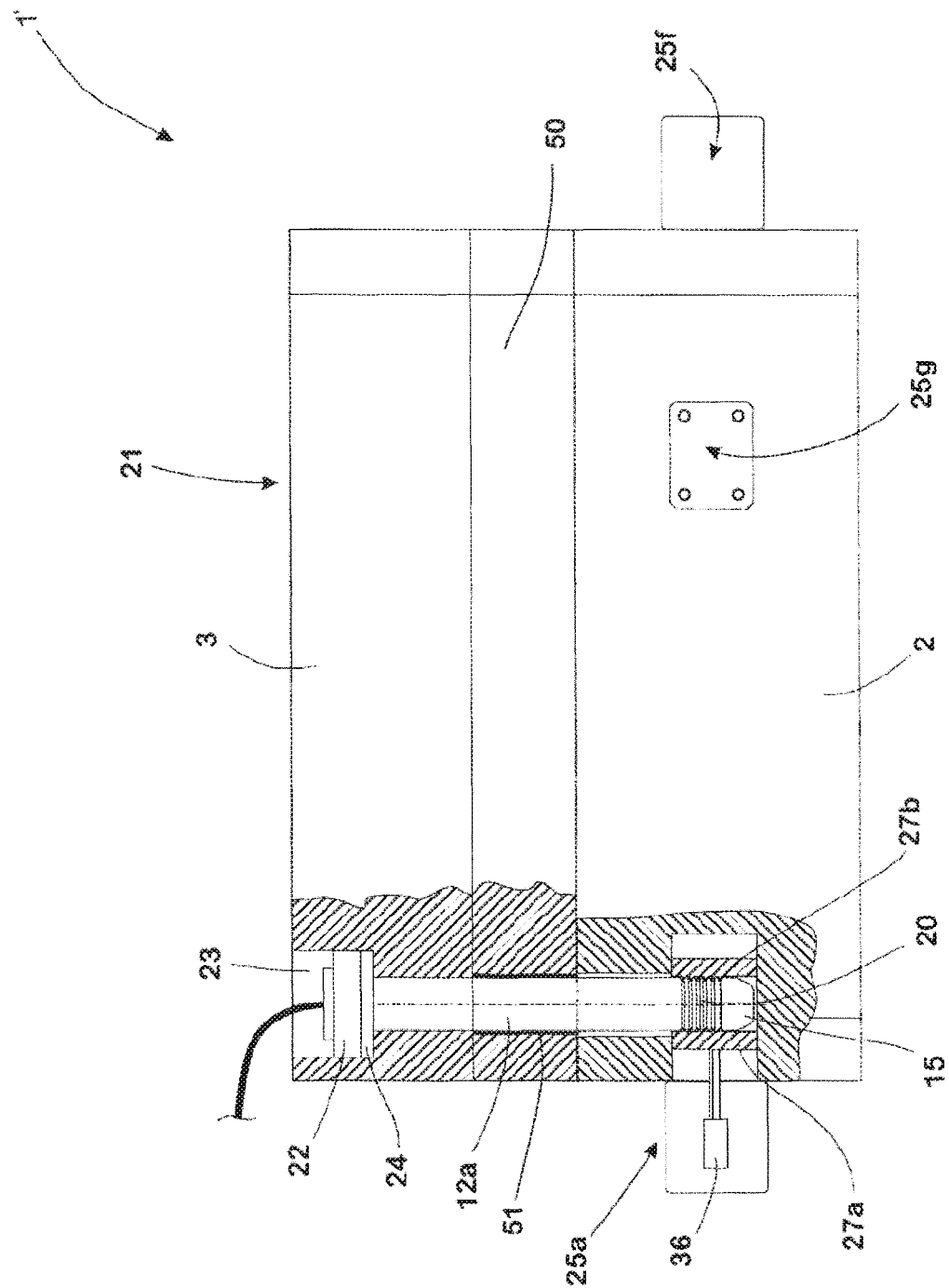

CASTING APPARATUS FOR PRODUCING CASTINGS FROM A METALLIC MELT

CROSS-REFERENCE TO RELATED APPLICATION

This application claims priority to European Patent Application No. 17202310.3 filed Nov. 17, 2017, the disclosure of which is hereby incorporated in its entirety by reference.

BACKGROUND OF THE INVENTION

Field of the Invention

The invention concerns a casting apparatus for producing castings from a metallic melt.

Description of Related Art

A casting apparatus of this kind usually comprises a casting die, which at least comprises two die halves. Optionally additional die plate elements can be provided between the die halves to allow the production of large volume castings or castings with filigree designs. At least a first die half of the die halves is movable relative to the respective second die half between a closed position, in which the die is closed for casting the molten metal, and an open position, in which the die is open for removing the casting formed from the molten metal. Each of the die halves comprise a front surface in which a recess is formed. Said front surfaces of the die halves are in close contact while the die is closed. While die is closed the recesses formed in the front surfaces of the die halves together form a die cavity in which the respective casting is formed from the molten metal poured or shot into the die.

Furthermore, in the casting apparatus an adjusting device is provided for adjusting the at least one movable die half between its open and closed position.

The molten melt being poured into the die cavity exert pressure on the die halves. To avoid that the movable die half is lifted from the other die half by this pressure in a casting apparatus of the kind the invention belongs to a clamping device is provided which can be switched between a clamping position in which it locks the die halves against relative movement to each other, while the die is closed, and a release position, in which the die halves are released from each other to allow the opening of the die. Different designs and specifications of casting apparatus of this kind exist in the prior art.

US 2003/0217829 A1 discloses a casting apparatus which comprises two die halves of which one die half is supported on a stationary support plate, whereas the movable second die half is fixed to a movable support plate. In the casting operation the support of the movable support plate, to which the movable die half is attached to, is realized by an adjusting bolt which is secured by means of a locking device on the movable support plate. The adjusting bolt is adjustable by means of a locking device attached to the movable support plate between a position, in which the access to the open die for removing the casting is released, and a holding position in which the support plate is locked in the closed position of the die. In this position, the end of the adjusting bolt, which is associated with the fixed support plate, is locked in a holder mounted on the support plate. At the same time the movable support plate is fixed to the adjusting bolt by means of a locking device formed by a split nut. For the adjustment of the movable die half between the open and the closed position separate actuating means are provided, which are actuated hydraulically and act between the support plates, with which they are permanently connected.

Also in the casting device known from US 2004/0178536 A1 a hydraulically operating adjustment mechanism with adjusting bolts is used to adjust the movable half of a casting die. The adjusting bolts can be adjusted relative to a plate carrying a movable die half. In a casting position, those ends of the adjusting bolts associated with a fixed plate can be fixed to locking devices held on the fixed plate. The locking devices each comprise a split nut, which engages in the locking position in a toothing provided on the associated end of the respective adjusting bolt.

In a further casting device known from U.S. Pat. No. 4,304,540 A a die with a fixed die half and a movable die half is provided, too. The fixed die half sits on a fixedly mounted plate-like support structure, while the movable die half is held on a plate-like movable support structure. Guide rods and separate hydraulic cylinders are provided for the relative movement of the movable die half with respect to the fixed die half. On the guide rods external teeth are formed at distanced positions at which the movable support structure bearing the movable die half can be locked by actuating a split nut.

A similar construction is realized in the casting apparatus known from EP 0 296 410 B1. Here, however, the locking device, which also comprises a split nut, is provided on the stationary die half as already disclosed in the aforementioned US 2004/0178536 A1.

A demand exists in the market for cast parts that have larger projected areas. The resulting volume and size of these parts extend past the capabilities of common machines in terms of the clamping force required to ensure the constant closure of the die during the pouring and solidification of the molten melt.

SUMMARY OF THE INVENTION

It was therefore the object of the invention to provide a casting apparatus which is capable of applying high clamping forces without the need for a fundamental redesign of the casting apparatus.

A casting apparatus according to the invention for producing castings from a metallic melt accordingly comprises:
  a casting die which at least comprises two die halves, of which at least a first die half is movable relative to the respective second die half between a closed position, in which the die is closed for filling the die with the molten metal, and an open position, in which the die is open for removing the casting formed from the molten metal, the die halves each comprising a front surface in which a recess is formed, the front surfaces of the die halves being in close contact and the recesses formed in the surfaces together forming a die cavity for forming the respective casting while the die is closed,
  an adjusting device for moving the movable die half, and
  a clamping device which is switchable between a clamping position in which it locks the die halves against relative movement to each other, while the die is closed, and a release position, in which the movable die halves are released from each other to open the die.

According to the invention now the clamping device is an integral part of the die halves of the casting apparatus in that the clamping device comprises a counter bearing provided in or on the first die half and a locking device which is provided in or on the second die half, the locking device being switchable between a clamping position in which the locking device is in a form fitting engagement with the counter bearing of the first die half to lock the die halves in the closed position, and a release position, in which the locking device is released from the counter bearing to release the die halves from each other for opening of the die.

The invention is thus started from the finding that by integrating the clamping device into the parts of the die it is possible to increase the clamping force of current machines. This is achieved according to the invention by adding a clamping assembly inside the die. By such modification in accordance with the invention it is therefore possible to cast larger projected area parts on smaller machines.

Based on this finding the idea of the invention is to divide the clamping device in a counter bearing which is assigned to the one die half and a locking device which is assigned to the other die half and which is designed such that in its locking position it form fittingly interacts with the counter bearing to lock the die halves in the closed position.

As a matter of course, the design of a casting apparatus according to the invention allows, as an option, to place at least one additional die plate element between the die halves to enlarge the volume of the die cavity defined by the die or to form castings of special designs. To be used in the apparatus according to the invention the additional die plate elements should be formed such the respective counter bearing and locking device provided in the die halves can be coupled together. For this, the size or shape of the additional die plate element can be adapted to the position of the respective counter bearing or locking device. In this regard it can be appropriate to provide a recess or opening in the optional die plate element through which the locking device or the counter bearing can be guided for connecting the counter bearing with the locking device.

Optionally the integration proposed by the invention is done such that it enables the clamping device to work in tandem with an adjustment and clamping device already present in a current casting machine outside the die. By such combined use the total tonnage capacity of the machine assembly can be significantly increased.

As a further option which can easily be realized in practice the counter bearing is formed by at least one counter bearing pin which is erected on the front surface of the first die half and the locking device is formed by at least one split nut assembly which is provided in the second die half and arranged such that the counter pin is inserted in the split nut assembly while the die is closed.

Suitable designs of split nut assemblies, which optionally may be used in accordance with invention as a locking device are principally known from the prior art mentioned above. However, in difference to the known casting machines the invention proposes to make the split nut, being used as the locking device, an integral component of the first die half and the corresponding bearing pin, being used as the counter bearing for the split nut, an integral component of the respective other die half.

Accordingly, the split nut assembly may comprise two nut halves which are movable between an open position in which an insert opening of the split nut assembly is widened for inserting the counter bearing pin, and a closed position ("locking position") in which the nut halves are moved together such that a toothing provided on each of the nut halves engages with a toothing being correspondingly formed at the circumference of the bearing pin. By the mutual engagement of the toothings of the bearing pin and the nut halves a form fitting connection between the die halves can be established which is free of play. By this, the clamping device provided in accordance with the invention does not only ensure a reliable locking and a tight contact of the front surfaces of the die halves but also supports the precise alignment of the die halves.

Furthermore, the use of a split nut assembly with nut halves which in accordance with the invention have a toothing and the provision of a corresponding toothing on the circumference of the respective bearing pin allows to produce from the clamping force, which is brought on the bearing pin by the nut halves from a radial direction, an additional force, which presses the die halves against each other, while the die is closed. This can be achieved in that the toothings of the split nut halves and of the bearing pin each have angular faces which are inclined with regard to the longitudinal central axis of the bearing pin and which are in close contact while the locking device is in its locking position so that the clamping force, which is brought by the nuts halves from a radial direction with regard to the longitudinal central axis of the bearing pin, is turned via the angular faces in a tensile force acting on the bearing pin.

As in the common practice the split nut assembly which may be used in accordance with the invention as a locking device, may comprise an actuating device for moving the nut halves, the actuating device being actuated hydraulically, pneumatically, mechanically or electrically. Preferably, a hydraulic actuation of the split pin assembly is provided which allows the application of particularly high clamping forces.

To ensure a precise correlation of the movement of the nut halves of the split nut assembly, which is optionally used as a locking device in an apparatus according to the invention, a guiding device may be provided for guiding the die halves of the split nuts during their adjustment between their open and closed position.

According to a further embodiment, which can be of especial importance if a current casting machine shall be retrofitted into a casting apparatus according to the invention, an additional actuating device may be provided which applies a tensile force to the counter bearing by which the movable die half is pulled against the other die half while the die is closed. The actuating device thus supports the adjustment device of the machine in pressing the die halves of the closed die against each other so that the tightness of die is ensured even if a high volume of molten melt is poured into the cavity surrounded by the die. In practice, such additional actuating device can be arranged between the counter bearing and that die half to which the counter bearing is assigned so that the counter bearing is supported against the die half the counter bearing is assigned to via the additional adjusting device.

In such arrangement the actuating device can pull the counter bearing against the associated die half. As the result of such pulling the second die half is correspondingly pulled against the first die half, to which the actuating device and the counter bearing is assigned, while the locking device assigned to the second device is in its locking position and the second die half is connected to the first die half via the counter bearing accordingly. This is especially feasibly if the counter bearing is realized as a counter bearing pin which is erected on the front surface of the first die half and which has an end portion which is supported against the first die half via the actuating device.

Alternatively it is also possible to assign the additional adjusting device to that die half which comprises the locking device. In this embodiment the locking device can be supported via the additional adjusting device against that first die half, to which the locking device is assigned, such that, while the locking device in its locking position, the additional adjusting device can push the locking device in a direction which leads away from the respective second die half to load the counter bearing with a tensile force by which the respective second die half, at which the counter bearing is anchored, is pulled against the first die half.

Another variant of the embodiment in which the adjustment device is located in that die half to which the locking device is assigned, is that the additional adjustment device is construed such that it can be coupled with the counter bearing independently from the locking device.

As an actuating device for the purposes explained above, a hydraulic nut can be used. Such actuating device allows the production of high forces and requires a minimal space.

As an additional option, the casting apparatus according to the invention may comprise a detecting device for detecting the stretching of the counter bearing resulting from the load the counter bearing is exposed during the filling of the die with the metallic melt. This measurement can include the measuring of the relative position of the die halves or the relative position of the respective counter bearing pin with regard to at least one of the die halves.

Such detecting device can be realized by a sensor, for example a Linear Variable Differential Transformer ("LVDT"). Such sensor can be arranged in the counter bearing of the clamping device. For this purpose, in the counter bearing a blind hole can be provided, in which the sensor can be placed. This is especially feasible if the counter bearing is formed as a counter bearing pin, in which, for example, the hole for placing the sensor is preferably formed in that face side which is assigned to the die half on which the counter bearing pin is erected.

If an actuating device is assigned to the counter bearing as explained above, the sensor optionally provided in accordance with the invention can be part of a closed loop control system which is used to monitor and regulate the amount of displacement of the respective counter bearing or die half.

According to a further optional embodiment of the invention, a number (i.e. two or more) of clamping devices are provided in an apparatus according to the invention, each of these clamping devices being an integral part of the die halves in that each of the clamping devices comprises a counter bearing provided in or on the first die half and a locking device which is provided in or on the second die half, the locking devices being switchable between a clamping position in which they are in a form fitting engagement with the counter bearing of the first die half to lock the die halves in the closed position, and a release position, in which the locking device is released from the counter bearing to release the die halves for moving the movable die half in the opening position, wherein the clamping devices are located depending on the load which occurs while the die is in the closed position and molten melt is filled in the die cavity. For example, a corresponding number (i.e. two or more) of locking devices and associated counter bearings can be provided to the periphery of the die. If, also for example, the die halves have a block like shape such that the die, while being closed, has a corresponding block like shape, too, it may be useful to locate at least one clamping device in each corner area of the die.

According to the invention, the counter bearing is assigned to the one die half and the locking device is assigned to the respective other die half. Thus, the counter bearing may be assigned to the movable die half and the locking device may be assigned to the fixed die half or vice versa. An optimized flow of forces can be achieved if the counter bearing (counter bearing pin) and, if present, the sensor and, if present as well, the actuating device are affixed to the moving die half, whereas the locking device is located on or in the die half which is unmovable fixed.

The apparatus according to the invention is especially suited for High Pressure Die Casting ("HPDC"). In HPDC the molten metal is injected into the closed die under a high pressure of typically 10 to 175 MPa. Once the die cavity is filled, the pressure is maintained until the casting solidifies. The die is then opened and the cast piece is taken out. The take out can be supported by ejector pins which eject the casting from the die. Often not only one but multiple castings are formed in the die which has for this purpose a corresponding number of cavities. In the skilled language, the multiple castings obtained by using such die are called "shots" (s. https://en.wikipedia.org/wiki/Die_casting).

In an apparatus according to the invention typically melts are processed which main component is aluminum.

A decisive advantage of the invention is that the clamping device provided in accordance with the invention adds clamping forces to a commercially available machine with little to no modification to the machine itself. This is made possible by integrating the clamping device in the die independently so that it is nearly completely independent from the other equipment of the casting machine in which the die is used. Thus, it is possible to easily implement the invention in different types of machines. Only slight modification to the machines drive system (e.g. its hydraulic system) would be required due to the added locking assembly and the optional actuating device.

BRIEF DESCRIPTION OF THE DRAWINGS

The invention is explained further below with reference to a drawing showing an example embodiment. The figures thereof respectively schematically show:

FIG. 3 the closed die in a view corresponding to FIGS. 1 and 2;

FIG. 4 a movable die half of the die according to FIGS. 1-3 in a top view;

FIG. 5 a fixed die half of the die according to FIGS. 1-3 in a top view;

FIG. 6*a* a nut half of a split nut in a top view;

FIG. 6*b* the nut half in a front view;

FIG. 6*c* the nut half in a view from behind;

FIG. 6*d* the nut half in a lateral view;

FIG. 7*a* a counter bearing pin in a lateral view;

FIG. 7*b* the counter bearing pin in a longitudinal section;

FIG. 9 an alternative embodiment of a die in its closed position in a view corresponding to FIG. 3.

DESCRIPTION OF THE INVENTION

Figure 1:
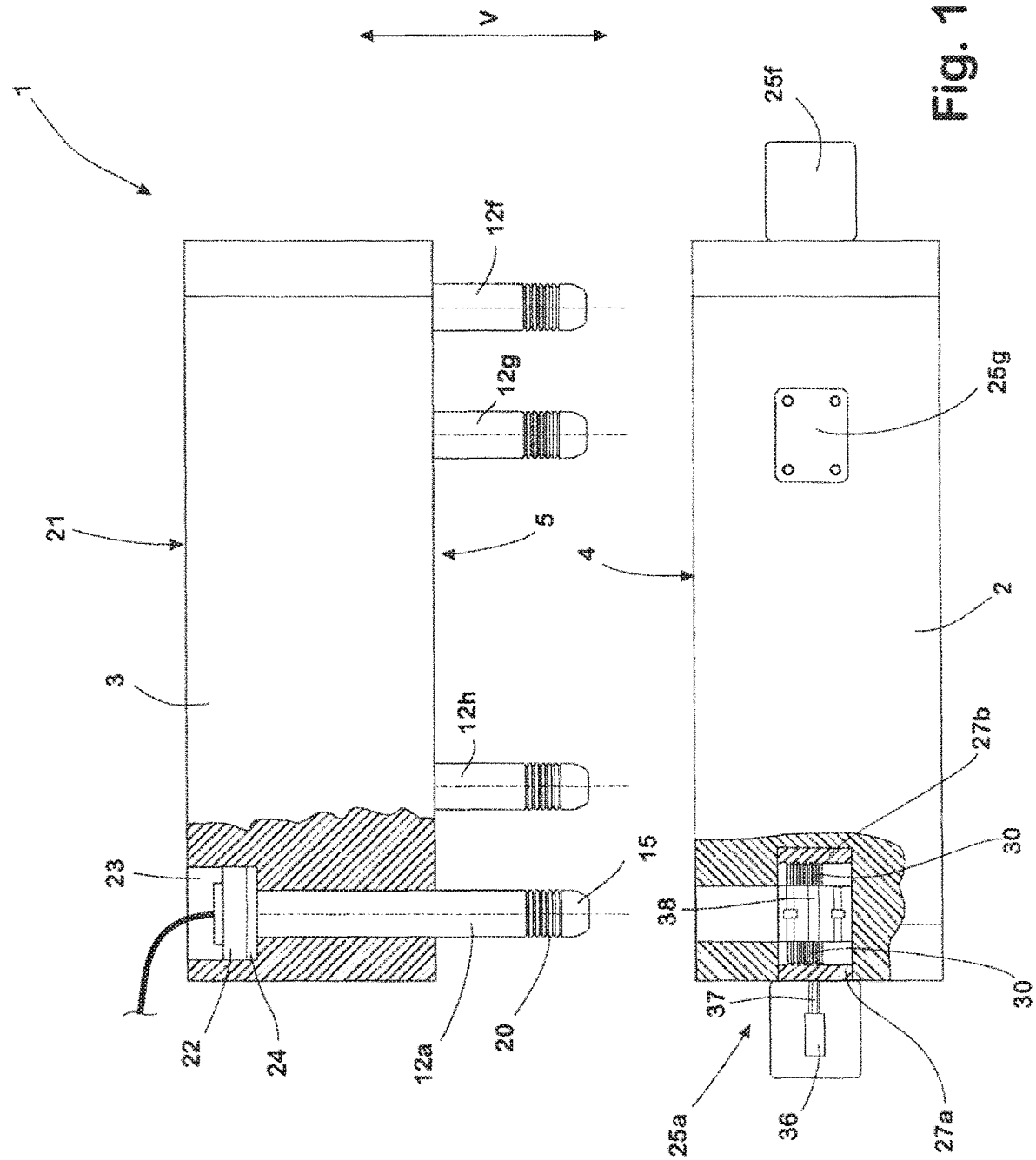
FIG. 1 an opened die for the production of casting in a lateral, partially sectioned view.

The die 1 is composed of two die halves 2,3 which have a block like shape, so that, once the die 1 is completely closed (FIG. 3), also the die 1 has a block like shape.

As shown in FIGS. 4 & 5 each die half 2,3 has a front surface 4,5 in which a recess 6,7 is formed. A flat peripheral border area 8,9 of the front surfaces 4,5 surrounds the respective recess 6,7.

The die halves 2,3 are arranged in a common High Pressure Die Casting apparatus which comprises a frame work (not shown) in which the first die half 2 is fixedly mounted whereas the second die half 3 is movably guided in a guiding device (not shown).

Hydraulic adjusting devices are provided in the casting apparatus to vertically move the movable die half 3 between an opened position (FIG. 1) in which the movable die half 3 is held in a certain vertical distance to the fixed die half 2 for removing the casting and a closed position (FIG. 3) in which the movable die half 3 rests with its front surface 5 on the front surface 4 of the fixed die half 2. In the closed position the recesses 6,7 of the die halves 2,3 together form the mold cavity in which the casting to be produced in formed.

In the casting apparatus a molten aluminum alloy is processed which is usually used for this purpose. Several other devices for pouring the molten melt in the closed die 1 with high pressure, for holding the die halves 2,3 and for controlling the movement of the die halves 2,3 and the pouring process etc. are provided in the apparatus, but are not shown here for clarity reasons. Common HPDC apparatus of the kind the apparatus according to the invention explained here belongs to and their elements and functions are well known to a skilled expert. Examples for such apparatus are disclosed in detail the patent publications mentioned in the introduction.

In each of the corner areas 10a-10d of the front surface 5 of the movable die half 3 two counter bearing pins 12a-12h are arranged, of which one is assigned to the respective narrow side 13a,13b and the other is assigned to the respective longitudinal side 14a,14b of the movable die half 3.

The counter bearing pins 12a-12h have a rod like shape with a rounded head 15 at its upper end section and a thread 16 on its lower end section. From the face side 17 the thread 16 is assigned to a blind hole 18 which is drilled into the counter bearing pins 12a-12h. In the blind hole 18 a LVDT-sensor 19 is placed which detects the stretching of the counter bearing 12a,12b resulting from the load the counter bearing 12a,12b is exposed during the filling of the die with the metallic melt. Adjacent to the head 15 a toothing 20 is formed in the circumference of the counter bearing pins 12a-12h.

The counter bearing pins 12a-12h each are guided with little play in through holes that run from the front surface 5 to the back side 21 of the movable die half 3, the length of the counter bearing pins 12a-12h being adjusted such that the counter bearing pins 12a-12h erect over the front surface 5 of the movable die half 3.

To each of the counter bearing pins 12a-12h an actuating device 22 is assigned. The actuating devices 22 are common hydraulic nuts. An example for such hydraulic nuts is shown in EP 2 199 025 A1.

Each of the actuating devices 22 are placed in a recess 23 which respectively is formed in the back side 21 of the movable die half 3 such that it is coaxially aligned to the longitudinal axis L of the respective counter bearing pin 12a-12h. With their thread 16 the counter bearing pins 12a-12h are screwed in the corresponding thread of the actuating devices 22, which are supported against the bottom of the recess 23 with their annular piston member 24. Accordingly, once the hydraulic nut is pressurized the respective counter bearing pin 12a-12h is pulled into the die half 2 along its longitudinal axis L.

Corresponding to the arrangement of the counter bearing pins 12a-12h on the surface of the movable die half 3 locking devices 25a-25h are arranged in the fixed die half 2.

Each of the locking devices 25a-25h consists of a split nut assembly 26, which comprises two nut halves 27a,27b, a hydraulic adjusting device 28 and four guiding members 29a,29b.

The two nut halves 27a,27b each have a recess 30a,30b which has the shape of a half cylinder. The inner cross section radius of the recesses 30a,30b corresponds to the outer cross section radius of the counter bearing pins 12a-12h. In the recesses 30a,30b a toothing 31 is formed which shape is adapted to the shape of the toothing 20 of the counter bearing pins 12a-12h such that when the nut halves 27a,27b lies against the associated counter bearing pin 12a-12h the toothing 31 of the respective nut half 27a,27b form fittingly engages the toothing 20 of the respective counter bearing pin 12a-12h.

In the corner areas of the side sections 32a,32b of the nut halves 27a,27b guide holes 33a-33d are formed which run from the front face 34, in which the recess 30a, 30b is formed, to the back face 35 of the respective nut half 27a,27b. In each of these guide holes 33a-33d one of the guiding members 29a,29b is slidably guided with its end section assigned to the respective nut half 27a,27b. By this the guiding members 29a,29b ensure a precise parallel movement of the nut halves 27a,27b.

The hydraulic adjusting device 28 is provided for moving the nut halves 27a,27b from a radial direction against the associated counter bearing pin 12a-12h. For this the adjusting device 28 is arranged in front of the back face 35 of the first nut half 27a. It comprises a hydraulic cylinder 36, a push-pull pin 37, which acts on the one nut half 27a, and a push-pull pin 38 which is connected to the second nut half 27b. For this purpose the push-pull pin 38 has two bars which are slidably guided through through holes 39 being formed in the first nut half 27a and fixed in corresponding openings of the second nut half 27b. The bars of the push-pull pin 38 each bear a positive stop 42a,42b, which defines that stop for the opening movement of the split nut assembly 26, at which the nut halves 27a,27b have reached their opening position.

Figure 8A:
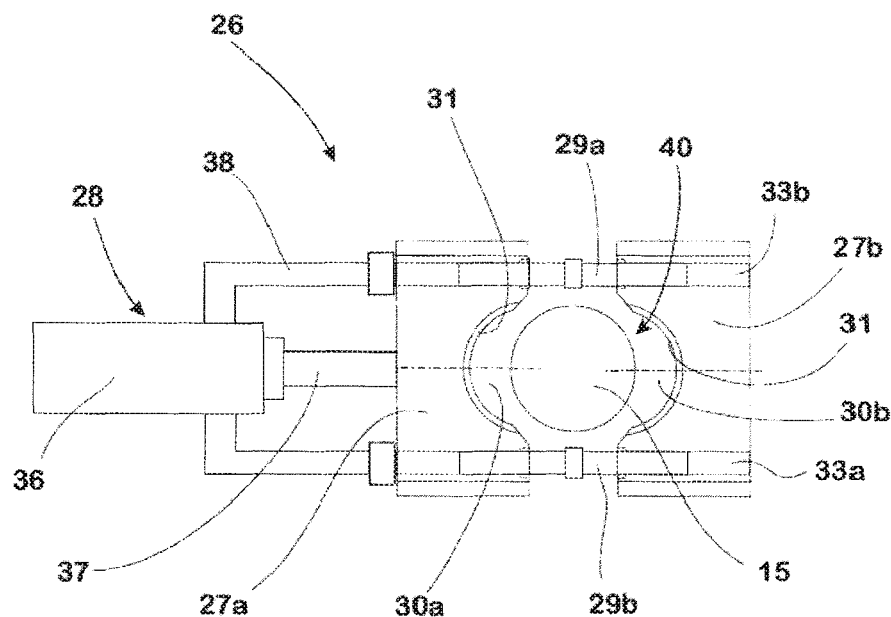
FIG. 8*a* a locking device in its opened position in a top view.
Figure 8B:
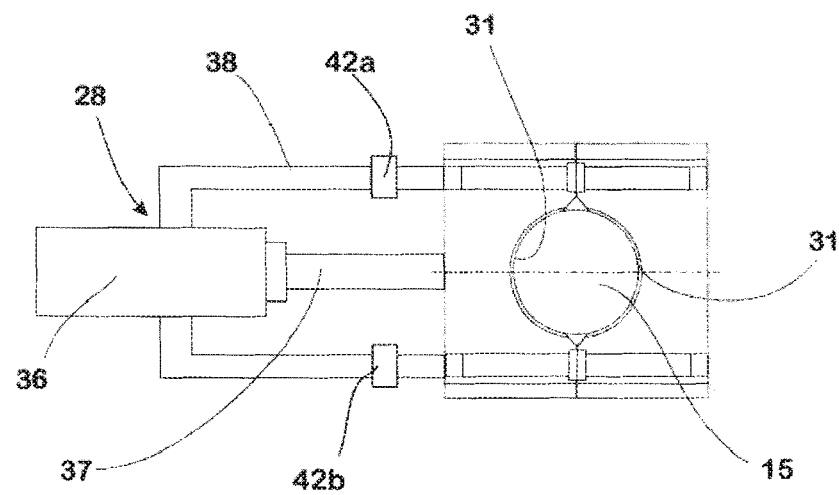
FIG. 8*b* the locking device in its locking position in a view corresponding to FIG. 8*a;*

For moving the nut halves 27a,27b between their opening position, in which the opening 40 being formed by the recesses 30a,30b surrounded by the nut halves 27a,27b is widened such that the associated counter bearing pin 12a-12h can be introduced into this opening or rejected from the opening (FIG. 8a), and their locking position, in which for locking the movable die half 3 in its closed position the nut halves 27a,27b of the split nut assembly 26 are narrowed to the respective counter bearing pin 12a-12h such that their toothing 31 form fittingly engages the toothing 20 of the respective counter bearing pin 12a-12h (FIG. 8b), the hydraulic cylinder 36 pushes the first nut half 27a via the pin 37 and pulls the second nut half 27b via the pin 38 (engaging/locking) such that the nut halves 27a,27b move towards each other or pulls the first nut half 27a via the pin 37 and pushes the second nut half 27b via the pin 38 such that they move away from each other (disengaging/opening). A spring return system (not shown) may be provided to allow for rapid retraction and effortless release of the nut halves 27a,27b.

For producing a casting in an apparatus according to the invention the following sequence of operations is performed:

Step a: The die 1 is open with the movable die half 3 being placed in its open position in which it is in a vertical distance to the fixed die half 2. The locking devices 25a-25h are in their opening position (nut halves 27a, 27b distanced from each other) and the actuating device 22 in rest position (FIG. 1).

Figure 2:
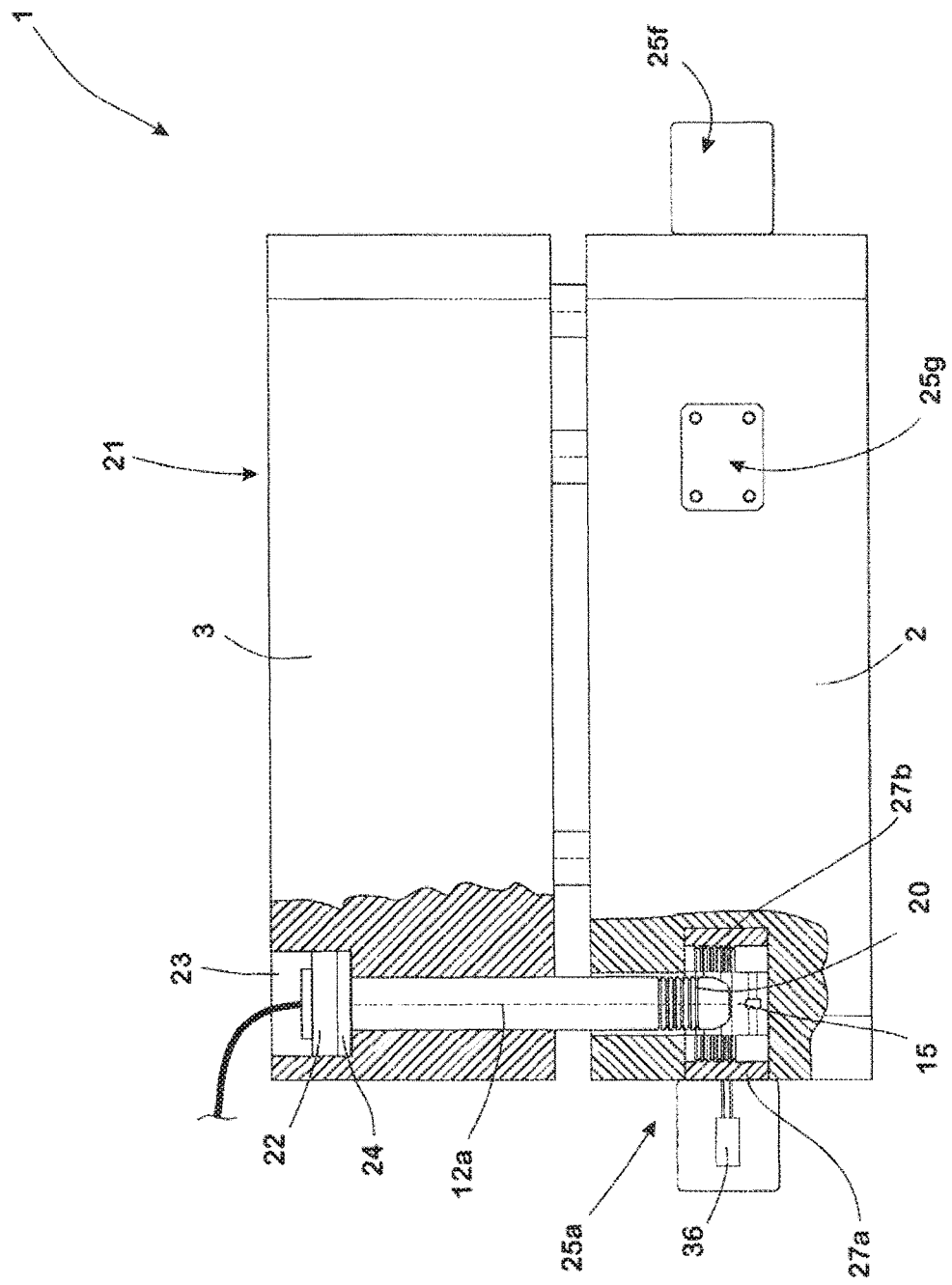
FIG. 2 the die during the closing process in a view corresponding to FIG. 1.

Step b: The movable die half 3 is lowered such that the counter bearing pins are introduced into the associated openings of the locking devices 25a-25h being formed by the recessed of the nut halves 27a,27b of the respective locking device 25a-25h, the nut halves 27a, 27b still being in their distanced, open position. The actuating device 22 also remains in its rest position (FIG. 2).

Step c: The movable die half 3 tightly sits with its front surface 5 on the front surface 4 of the fixed die half 2. The locking devices 25a-25h are in their locking position by moving the nut halves 27a,27b of the respective locking device 25a-25h towards each other such that they form fittingly engage the toothing 20 of the associated counter bearing pin 12a-12h. The actuating device 22 is pressurized such that it loads the counter bearing pins 12a-12h with a tensile force by which the movable die half 3 is pulled and pressed against the fixed die half 2. The tensile displacement and the corresponding clamping force, with which the die halves 2,3 are pressed together, are monitored and controlled on the basis of the signals provided by the sensors 19 being placed in the counter bearing pins 12a-12h close to the associated actuating device 22. By tying the measuring signals of the sensors 19 into a closed loop feedback control system the clamping force applied can be controlled in real time. The feedback control system may vary the hydraulic pressure applied to each of the actuating devices 22 (hydraulic nuts) so that the correct displacement is achieved on each counter bearing pin 12a-12h.

Step d: Pouring (=shooting) the molten Al-alloy in the cavity of the closed die 1. Solidifying of the melt poured (=shot) into the mold cavity.

Step e: Disengaging the locking devices 25a-25h by moving the nut halves 27a,27b of the locking devices 25a-25h away from each other such that the toothings 20,31 of the respective nut halves 27a,27b and the associated counter bearing pin 12a-12h disengage. Reliving the actuating devices 22 from the hydraulic pressure such that they move in their rest position.

Step f: Moving the movable die half 3 in the vertical direction away from the fixed die half 2 to open the die 1.

Step g: Holding the movable die half 3 in its open position and ejecting the cast piece formed from the metal being shot and solidified in the die cavity.

FIG. 9 shows a variant of the die 1 shown in FIG. 1-3.

In the die 1' shown in FIG. 9 between the movable upper die half 3 and the fixed lower die half 2 an additional die plate element 50 is placed by which complexly formed details of the casting to be cast in the die can be formed or a larger volume of the cavity defined by the die 1' can be provided.

The outer circumferential shape of the die plate 50 is adapted to the outer circumferential shape of the die halves 2,3 so that the die halves 2,3 together with the die plate element 50 form a compact block.

To each of the counter bearing pins 12a-12h a through hole 51 is assigned, through which the respective counter bearing pin 12a-12h is guided into the assigned locking device 25a-25h being located in the fixed die half 2.

Irrespective of the presence of the additional die plate element 50 the design and function of the other elements of the die 1' identically corresponds to the design and function of the respective corresponding elements of the die 1 shown in FIG. 1-3.

While the die 1' is closed, their die halves 2,3 each are pressed with their front surface 4,5 against that side face of the additional die plate element 50 which is assigned to the respective die half 2,3. The tight contact between the front surfaces 4,5 of the die halves 2,3 and the front surfaces 4,5 of the additional die plate element 50 assigned to them is ensured in the same manner as the tight direct contact between the front surfaces 4,5 of the die 1 shown in FIG. 1-3.

REFERENCE SIGNS 1,1' die
2 fixed die half
3 movable die half
4 front surface of the die half 2
5 front surface of the die half 3
6,7 recess of the die halves 2,3
8,9 peripheral border areas of the front surfaces 4,5
10a-10d corner areas of the front surface 5 of the movable die half 3
12a-12h counter bearing pins
13a,13b narrow sides of the movable die half 3
14a,14b longitudinal sides of the movable die half 3
15 rounded head of the counter bearing pins 12a-12h
16 thread of the counter bearing pins 12a-12h
17 lower face side of the counter bearing pins 12a-12h
18 blind hole of the counter bearing pins 12a-12h
19 LVDT-sensor
20 toothing of the counter bearing pins 12a-12h
21 back side of the movable die half 3
22 actuating device
23 recess formed in the back side 21 of the movable die half 3
24 annular piston member of the actuating device 22
25a-25h locking devices
26 split nut assembly
27a,27b nut halves of the split nut assembly 26
28 hydraulic adjusting device
29a,29b guiding members
30a,30b recess of the nut halves 27a,27b
31 toothing of the nut halves 27a,27b
32a,32b side sections of the nut halves 27a,27b
33a-33d guide holes
34 front face of the nut halves 27a,27b
35 back face of the nut halves 27a,27b
36 hydraulic cylinder
37,38 push-pull pins
39 through holes
40 opening being formed by the recesses 30a,30b
50 additional die plate element
51 through hole of the additional die plate element
V vertical direction

The invention claimed is:

1. A casting apparatus for producing castings from a metallic melt, the casting apparatus comprising:
a casting die which at least comprises two die halves, of which at least a first die half is movable relative to a respective second die half between a closed position, in which the die is closed for filling the die with the metallic melt, and an open position, in which the die is open for removing the casting formed from the metallic melt, the die halves each comprising a front surface in which a recess is formed, the front surfaces of the die halves being in close contact and the recesses formed in the front surfaces together forming a die cavity for forming the respective casting while the die is closed;
an adjusting device for moving the movable die half; and
a clamping device which is switchable between a clamping position in which it locks the die halves against movement relative to each other, while the die is closed, and a release position, in which the die halves are released from each other to open the die,
wherein the clamping device is an integral part of the die halves of the casting apparatus in that the clamping device comprises a counter bearing provided in or on the first die half and a locking device provided in or on the second die half, the locking device being switchable between a clamping position in which the locking device is in a form fitting engagement with the counter bearing of the first die half to lock the die halves in the closed position, and a release position, in which the locking device is released from the counter bearing to release the die halves from each other for opening of the die.

2. The casting apparatus according to claim 1, wherein the counter bearing is formed by at least one counter bearing pin which is erected on the front surface of the first die half and wherein the locking device is formed by at least one split nut assembly which is provided in the second die half and arranged such that the counter bearing pin is inserted in the split nut assembly while the die is closed.

3. The casting apparatus according to claim 2, wherein the split nut assembly comprises two nut halves, each of which has a recess in which a toothing is formed and wherein the counter bearing pin has a toothing which is adapted to the toothing of the nut halves so that the toothing of the nut halves form fittingly engage the toothing of the assigned counter bearing pin while the locking device is in the locking position.

4. The casting apparatus according to claim 3, wherein the split nut assembly comprises an actuating device for moving the nut halves between an open position in which they are distanced from each other and a closed position in which their front faces are in close contact, the actuating device being actuated hydraulically, pneumatically, mechanically, or electrically.

5. The casting apparatus according to claim 3, wherein the toothings of the split nut halves and of the bearing pin each have angular faces which are inclined with regard to the longitudinal central axis of the bearing pin and which are in close contact while the locking device is in its locking position so that the clamping force, which is brought by the nuts halves from a radial direction with regard to a longitudinal central axis of the counter bearing pin, is turned via the angular faces by a tensile force acting on the counter bearing pin which pulls the movable die half against the other die half.

6. The casting apparatus according to claim 4, wherein a guiding device is provided for guiding the nut halves of the split nut assembly during adjustment between the open and the closed position.

7. The casting apparatus according to claim 1, wherein the apparatus comprises a detecting device for detecting the stretching of the counter bearing resulting from the load the counter bearing is exposed to during the filling of the die with the metallic melt.

8. The casting apparatus according to claim 7, wherein the detecting device comprises a sensor which is arranged in the counter bearing of the clamping device.

9. The casting apparatus according to claim 8, wherein a blind bore is provided for placing the sensor in the counter bearing.

10. The casting apparatus according to claim 1, wherein the apparatus comprises two or more clamping devices, each of these clamping devices being an integral part of the die halves in that each of the clamping devices comprises a counter bearing provided in or on the first die half and a locking device which is provided in or on the second die half, the locking devices being switchable between a clamping position in which the locking devices are in a form fitting engagement with one of the counter bearings of the first die half to lock the die halves in the closed position, and a release position, in which the locking devices are released from the counter bearings to release the die halves for moving the movable die half in the opening position, and wherein the clamping devices are located depending on the load which occurs while the die is in the closed position and metallic melt is filled in its cavity.

11. The casting apparatus according to claim 10, wherein the die halves are block shaped, such that the die, while being closed, has a corresponding block like shape, and wherein at least one clamping device is located in each corner area of the die.

12. The casting apparatus according to claim 1, wherein the counter bearing is assigned to the movable die half whereas the die half to which the locking device is assigned is fixed.

13. The casting apparatus according to claim 1, wherein an actuating device is assigned to the counter bearing that applies a tensile force to the counter bearing by which the movable die half is pulled against the other die half while the die is closed.

14. The casting apparatus according to claim 13, wherein the actuating device is a hydraulic nut.

15. The casting apparatus according to claim 14, wherein the counter bearing is supported by the additional actuating device against that die half, to which the counter bearing is assigned.

* * * * *